May 13, 1930.  N. C. SHAW  1,758,540
RELAY SYSTEM
Filed Jan. 21, 1929
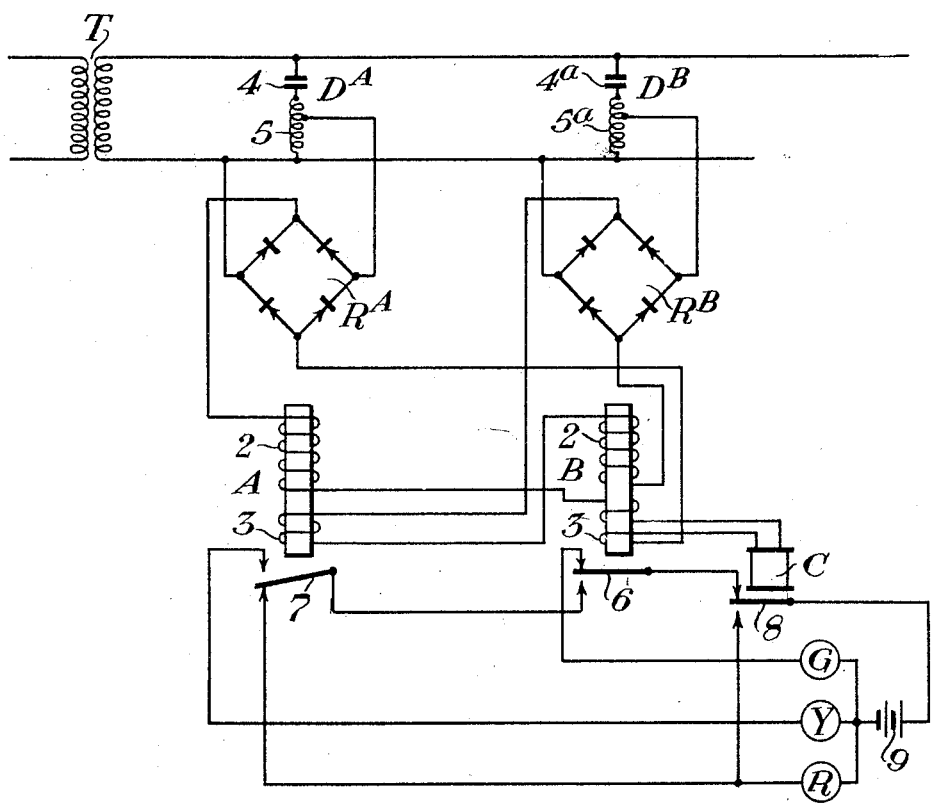
INVENTOR:
N. C. Shaw,
BY
His ATTORNEY Patented May 13, 1930

1,758,540

UNITED STATES PATENT OFFICE

NOBLE C. SHAW, OF SWISSVALE PENNSYLVANIA, ASSIGNOR TO THE UNION SWITCH & SIGNAL COMPANY, OF SWISSVALE, PENNSYLVANIA, A CORPORATION OF PENNSYLVANIA

RELAY SYSTEM

Application filed January 21, 1929. Serial No. 333,777.

My invention relates to relay systems of the type wherein two or more relays are supplied with current from two or more sources respectively, the voltages of which vary in such manner that when the voltage of any one source is relatively high, the voltages of the remaining sources are relatively low, the variations in the voltages of the sources being the only means for controlling the relays, so that each relay is closed when the voltage of its associated source is high and is open when the voltage of its associated source is low.

One feature of my invention is the provision, in a system of this character, of an auxiliary winding for each relay supplied with current from one of the sources other than the source associated with such relay, which current creates a flux opposing that created by the current in the main winding of the relay, so that when the voltage of the associated source is low, the flux created thereby is substantially neutralized and the effect on the relay is substantially the same as though its operating circuit were opened.

I will describe one form of system embodying my invention and will then point out the novel features thereof in claims.

The accompanying drawing is a diagrammatic view showing one form of system embodying my invention.

Referring to the drawing, the reference character T designates a transformer, the primary of which is at times supplied with periodic or alternating current of one frequency, and at other times supplied with periodic or alternating current of a different frequency. These frequencies may, for example, be 120 cycles per minute and 180 cycles per minute. The secondary circuit for transformer T is provided with two branches $D^A$ and $D^B$, each comprising a condenser 4 and a reactor 5. The branch $D^A$ is tuned to resonance at 120 cycles per minute and the branch $D^B$ is tuned to resonance at 180 cycles per minute. The input terminals of a full wave rectifier $R^A$ are connected across a portion of reactor 5 in branch $D^A$, and the input terminals of a similar full wave rectifier $R^B$ are connected across a portion of the reactor $5^a$ in the branch $D^B$. It follows that when the transformer T is supplied with current of 120 cycles per minute, the voltage across the output terminals of rectifier $R^A$ is relatively high, whereas the voltage across the output terminals of rectifier $R^B$ is relatively low; whereas when the transformer T is supplied with current of 180 cycles per minute, the voltage across the output terminals of rectifier $R^B$ is relatively high and the voltage across the output terminals $R^A$ is relatively low.

Associated with rectifiers $R^A$ and $R^B$ are two relays A and B respectively, each of which is provided with a main winding 2 having a relatively large number of turns, and an auxiliary winding 3 having a relatively small number of turns. The output terminals of rectifier $R^A$ are connected in a circuit which includes winding 2 of relay A and winding 3 of relay B in series, whereas the output terminals of rectifier $R^B$ supply current to a circuit which includes winding 2 of relay B and winding 3 of relay A connected in series.

The output circuit of rectifier $R^A$ also includes the winding of a checking relay C, and as here shown, the winding 3 of relay B is in two parts with the checking relay C connected between them. The function of the checking relay will be explained hereinafter.

The windings 2 and 3 are so connected in the two relay circuits that the flux created by winding 3 in each relay opposes the flux created by the associated winding 2.

For purposes of explanation, I will assume that each winding 2 is made up of 2000 turns, and that each winding 3 is made up of 500 turns. I will also assume that the maximum current through winding 2 of relay A and winding 3 of relay B is .04 of an ampere, and that at the same time the current through winding 2 of relay B and winding 3 of relay A is .01 of an ampere. The ampere turns in winding 2 of relay A will then be 2000×.04, which equals 80 ampere turns. The ampere turns in winding 3 of relay A will be 500×.01, which equals 5 ampere turns. The net result in relay A will therefore be 80−5 or 75 ampere turns, and this will be sufficient to close the armature of this relay.

Winding 2 of relay B will have 2000×.01 or 20 ampere turns. Winding 3 of relay B will have 500×.04 or 20 ampere turns. The ampere turns energizing relay B will therefore be 20−20 or 0, so that this relay will be completely de-energized and, of course, its armature will be open.

When current of 180 cycles per minute is supplied to transformer T, the conditions will be exactly reversed in that relay B will have 75 ampere turns and relay A will have 0 ampere turns.

It will be noted that as the current through winding 2 of relay A and 3 of relay B decreases, and the current through the other two windings increases, the release value for relay A will be raised, this release value being the amount of current flowing through winding 2 below which the relay will release. Under the conditions set forth above, the release value for either of the relays is raised .01 of an ampere while the working current value of the relay is raised only .0025 of an ampere.

Relays A and B may be used to control any suitable form of apparatus. As here shown, they control a signal comprising three lamps G, Y and R. When relay B is energized, lamp G is lighted by virtue of a circuit which passes from battery 9, through the front point of contact 8 of checking relay C, the front point of contact 6 of relay B and lamp G to battery 9. When relay A is energized, the lamp Y is lighted by virtue of a circuit which passes from battery 9, through the front point of contact 8 of relay C, back point of contact 6 of relay B, front point of contact 7 of relay A, and lamp Y to battery 9. When relays A and B are both de-energized, lamp R is lighted, the circuit being from battery 9, through front point of contact 8 of relay C, back point of contact 6 of relay B, back point of contact 7 of relay A, and lamp R to battery 9.

Assuming that lamp G is the proceed indication lamp in a railway traffic controlling system, it will be observed that if the output circuit of rectifier $R^A$ should become open, then when the frequency of the current supplied to transformers T is 120 cycles per minute, so that relay A should be energized and relay B de-energized, relay B might be falsely energized due to the current supplied to its winding 2 from rectifier $R^B$, the reason for this being that the opposing flux normally created by winding 3 of relay B would be absent. To guard against this false operation, I have included the checking relay C in the output circuit of rectifier $R^A$, so that if this circuit becomes open relay C will become de-energized and the circuit for lamp G traced hereinbefore will be opened at the front point of contact 8. Lamp R will then be lighted by a circuit which includes battery 9 and the back point of contact 8 of relay C.

As pointed out hereinbefore, winding 3 of relay B is in two parts which are connected in series, and relay C is interposed in the circuit between these two parts. The purpose of this is to detect any short circuit which would render the entire winding 3 ineffective and would have the same effect on the relay B as if the output circuit for rectifier $R^A$ were open.

Although I have herein shown and described only one form of signaling system embodying my invention, it is understood that various changes and modifications may be made therein within the scope of the appended claims without departing from the spirit and scope of my invention.

Having thus described my invention, what I claim is:

1. In combination, two relays A and B each having two windings 2 and 3 made up of a relatively great and a relatively small number of turns respectively, a first circuit including winding 2 of relay A and winding 3 of relay B, a second circuit including winding 2 of relay B and winding 3 of relay A, and means for at times applying a relatively high voltage to said first circuit and a relatively low voltage to said second circuit, and for at other times applying a relatively high voltage to said second circuit and a relatively low voltage to said first circuit, said windings and said voltage producing means being so connected in said circuits that the fluxes produced by windings 2 and 3 of each relay oppose each other.

2. In combination, two relays A and B each having two windings 2 and 3 made up of a relatively great and a relatively small number of turns respectively, a first circuit including winding 2 of relay A and winding 3 of relay B, a second circuit including winding 2 of relay B and winding 3 of relay A, a checking relay interposed in one of said circuits, and means for at times applying a relatively high voltage to said first circuit and a relatively low voltage to said second circuit, and for at other times applying a relatively high voltage to said second circuit and a relatively low voltage to said first circuit, said windings and said voltage producing means being so connected in said circuits that the fluxes produced by windings 2 and 3 of each relay oppose each other.

3. In combination, two relays A and B each having two windings 2 and 3 made up of a relatively great and a relatively small number of turns respectively, a first circuit including winding 2 of relay A and winding 3 of relay B, a second circuit including winding 2 of relay B and winding 3 of relay A, winding 3 of relay B being in two parts, a checking relay connected with said first circuit between the said two parts of winding 3 of relay B, and means for at times applying a relatively high voltage to said first circuit and a relatively low voltage to said second circuit, and for at other times applying a relatively high voltage to said second circuit and a relatively low voltage to said first circuit, said windings and said voltage producing means being so connected in said circuits that the fluxes produced by windings 2 and 3 of each relay oppose each other.

4. In combination, two relays A and B each having two windings 2 and 3 made up of a relatively great and a relatively small number of turns respectively, a first circuit including winding 2 of relay A and winding 3 of relay B, a second circuit including winding 2 of relay B and winding 3 of relay A, two full wave rectifiers having their output terminals connected with said first and second circuits respectively, an alternating current circuit having two multiple paths tuned to two different frequencies, means for supplying said alternating current circuit with current of one or the other of said frequencies, and means for connecting the input terminals of said two rectifiers with the two multiple paths respectively of said alternating curent circuit, said windings and rectifiers being so connected in said first and second circuits that the fluxes produced by windings 2 and 3 of each relay oppose each other.

5. In combination, two relays A and B each having two windings 2 and 3 made up of a relatively great and a relatively small number of turns respectively, a first circuit including winding 2 of relay A and winding 3 of relay B, a second circuit including winding 2 of relay B and winding 3 of relay A, a checking relay included in said first circuit; a proceed, a caution and a stop signal; a circuit for said proceed signal including a front contact of relay B and a front contact of said checking relay, a circuit for said caution signal including a front contact of relay A and a back contact of relay B as well as a front contact of said checking relay, a main circuit for said stop signal including back contacts of relays A and B and a front contact of said checking relay, an auxiliary circuit for said stop signal including a back contact of said checking relay, and means for at times applying a relatively high voltage to said first circuit and a relatively low voltage to said second circuit, and for at other times applying a relatively high voltage to said second circuit and a relatively low voltage to said first circuit, said windings and said voltage producing means being so connected in said circuits that the fluxes produced by windings 2 and 3 of each relay oppose each other.

6. In combination, two sources of current of which at times the voltage of one is high and that of the other is low, while at other times the voltage of the second source is high and that of the first is low, two relays having main windings supplied with current from said two sources, respectively, and an auxiliary winding for each relay supplied with current from the source other than the one supplying current to the associated main winding for opposing the flux created by the associated main winding.

In testimony whereof I affix my signature.

NOBLE C. SHAW.